United States Patent [19]

Newman et al.

[11] Patent Number: 4,710,129
[45] Date of Patent: Dec. 1, 1987

[54] SIMULATION DEVICE

[75] Inventors: Geoffrey C. S. Newman, Watton; Andrew L. Pilkington, Attleborough; Kenneth H. Winch, Diss, all of England

[73] Assignee: Scortech Mech. Ltd., Attleborough, United Kingdom

[21] Appl. No.: 827,277

[22] Filed: Feb. 6, 1986

[51] Int. Cl.[4] ............................................... A63G 31/02
[52] U.S. Cl. ......................................... 434/55; 434/45; 273/DIG. 28; 272/18
[58] Field of Search ..................................... 434/45, 55; 273/DIG. 28; 272/16–18

[56] References Cited

U.S. PATENT DOCUMENTS

| | | | |
|---|---|---|---|
| 2,485,266 | 10/1949 | Edinburg | 434/55 |
| 2,687,580 | 8/1954 | Dehmel | 434/55 |
| 4,478,407 | 10/1984 | Manabe | 434/45 |
| 4,527,980 | 7/1985 | Miller | 434/55 |

Primary Examiner—Leo P. Picard
Attorney, Agent, or Firm—Edwin D. Schindler

[57] ABSTRACT

A simulation device which comprises a cabin mounted for movement in one or more senses, apparatus for control such as a joystick, in the cabin to at least in part control cabin movement produced by one or more motors, display apparatus in the cabin producing a window-type and/or radar-type display, sensors for sensing cabin movement, and one or more CPUs responsive to the sensors for causing the display to change at least in part in synchronized relationship to the cabin movements.

10 Claims, 2 Drawing Figures

SIMULATION DEVICE

FIELD OF THE INVENTION

This invention relates to a simulation device.

BACKGROUND TO THE DISCLOSURE

Arcade games are known in which a cabin houses a VDU which is microprocessor controlled to change the display at least in part responsively to movement of a joystick or the like in the cabin. In one example of a game of this type the VDU display simulates the view seen from the driving seat of a racing car, and the display changes responsively to operation of an accelerator pedal and a steering wheel. Disadvantageously, the game is lacking in realism at least in part due to the static condition of the cabin. The user has no physical sense of movement corresponding to the changing display, which only occupies a part of the user's field of view. In order to provide the physical sense of movement, other types of apparatus wherein the display covers the whole of the field of view of the user, as in a panoramic cinema enclosure, have been devised.

It is an object of this invention to provide a different type of simulation device which enables a physical sense of movement to be obtained without use of a panoramic display.

THE INVENTION

According to the invention, there is provided a simulation device which comprises a user-occupancy means, a base on which the said means is mounted with freedom for movement in at least one direction or sense, control means carried by the occupancy means for at least one motor which drives the said means, a display means carried by the occupancy means, at least one sensor for sensing the movement of the occupancy means, and a controller which at least partly controls the display means responsively to signals received from the at least oen sensor so as to cause the display at least in part to change in synchronised relationship to the movement of the occupancy means. Preferably, the user occupancy means is a cabin.

The controller, for example one or more computers or microcomputers, will preferably control the display means, for example one or more VDUs or television monitors, so that one or more changing displays spatially matches the cabin movement, e.g. so that a VDU appears to constitute a window to the cabin exterior, presenting a changing view matched to the changing position of the window as the cabin moves, and/or so that a VDU provides a radar-type display changing responsively to the cabin movement. For example, if the cabin is turned about a vertical axis, the VDU display may be scrolled sideways in the appropriate direction.

The simulation device of this invention may be arranged to act as a real life simulator, for example with the cabin representing an aircraft cockpit or a space capsule, or may be arranged to play a game, for example a type of chase and fire game. In the latter case, a computer or microcomputer will be programmed or programmable to move alien objects across the window screen and/or radar display, which objects can be followed and brought into the field of artificial firing sights by movement of the cabin. The display which enables the game, e.g., the alien objects, may be superimposed at the window screen on a background display of the sky or other simulated external environment which changes with movement of the cabin in the manner previously described, and correspondingly at the radar screen. In this instance the device may be considered to combine a real life and a game simulation, and the game display will generally include items, again for example, the alien objects, which more relatively to the real life background display, i.e. in part move on the VDU independently of changes thereof due to cabin movement. It may be preferred to use one processing unit to control the window display and another to control the radar-type display.

The cabin may include a control panel, additional to the movement control means, which has switches or other elements at least some of which are employed by the user to enable interaction with the display. Other switches or the like on the panel may control cabin lighting and the like. Sound effects may be controlled by the computer(s), for example to indicate "hits" and collisions. The control panel may also include various indicators, appropriate to the simulation.

The movement control means may conveniently be constituted by a joystick, possibly with one or more in-built control buttons, for example to control firing. The joystick or other movement control will preferably be situated in front of a user's seat, conveniently placed for viewing the display and access to the control panel.

The cabin will preferably have at least two degrees of freedom of movement relative to the base, conveniently at least two possible rotational or other spatial movements about mutually perpendicular axes, more especially to enable the movement commonly known as pitch and yaw. A limited translatory movement on the base, more especially in the vertical direction, may also be provided for.

In general, a sensor will be provided for each freedom of movement and these sensors will supply signals to the computer means for at least in part controlling the display on the VDU or VDUs.

It is to be noted that, since the sensor(s) respond to any cabin movement, the window display will reflect all cabin movements, including applied vibrational effects and/or simulated hits by aliens and/or cabin movement due to movement of the user which disturbs the balance of the cabin on its mountings.

A convenient mechanical arrangement comprises an upstanding yoke mounted for rotational movement on the base about a vertical axis, the cabin being suspended between the arms of the yoke on a mounting which defines a horizontal axis of rotation. An angular swing of up to 90 degrees for pitch and possibly up to 360 degrees for yaw, will be sufficient for almost all types of simulation. These limitations facilitate movement sensing and matching of the display on the VDU to the cabin movements.

In the case of a game, the device may be coin operable, and be activated for a limited period only when a genuine coin is inserted and accepted.

The drive to the cabin is preferably by one or more electric motors, but a pneumatic, hydraulic or other suitable drive may be employed instead.

BRIEF DESCRIPTION OF DRAWINGS

An embodiment of simulator device in accordance with the invention is now described by way of example with reference to the accompanying drawings, in which.

DESCRIPTION OF EMBODIMENT

Figure 1:
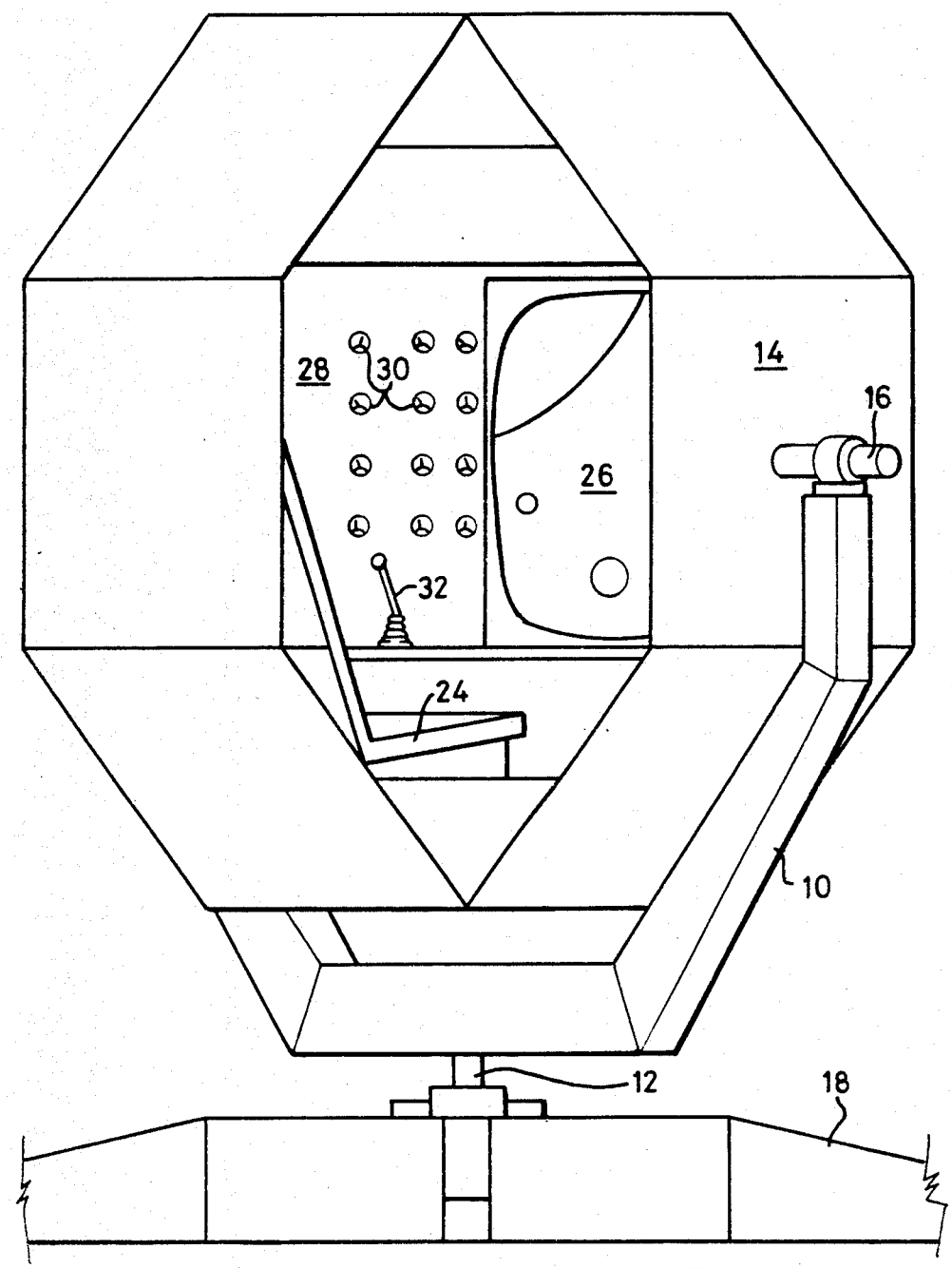
FIG. 1 shows the device in elevation, with a partial view into the cabin through an access opening from which the door has been removed.

In the illustrated embodiment, a yoke 10 is mounted for rotation about a vertical shaft 12. The yoke 10 supports a cabin 14 for rotation about a horizontal axis defined by stub shafts 16. The cabin 14 is thereby movable relative to a base 18 to undergo pitch and yaw movements under the respective drives of a pitch motor 20 and a yaw motor 22 (see FIG. 2).

Within the cabin 14 is a user seat 24 conveniently placed to view VDUs 26 and 27 and a control panel 28, the latter including indicators and user operable switches generally referenced 30. A joystick control 32 is located adjacent the user seat 24.

The cabin is arranged to be a total enclosure as far as the occupant's field of view is concerned, so that the only apparent contact the user has with the external environment is at the VDU display.

Figure 2:
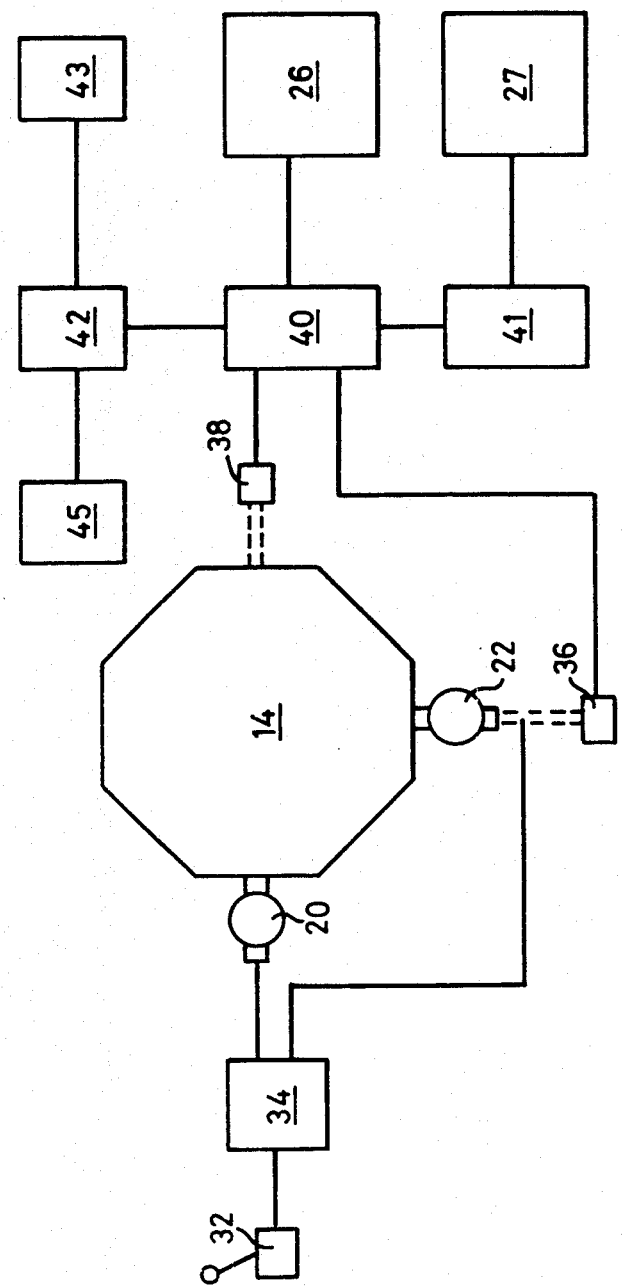
FIG. 2 is a block circuit diagram of the device.

Referring to FIG. 2 in particular, the joystick 32 controls the pitch and yaw movements of the cabin 14 via an attitude motor controller 34 which controls the pitch and yaw motors 20, 22.

The rotational movements of the cabin 14 are sensed by a yaw attitude sensor 36 and a pitch attitude sensor 38. These snesors 36, 38 provide output signals to CPUs 40 and 41, which in turn control the on-board VDUs 26 and 27. Also connected to the CPUs 40 and 41 is a game program generator 42, which is also connected to a sound generator 43 and a vibration generator 45.

The CPUs 40 and 41 which are of a conventional kind including RAM and EPROM memories, are programmed to cause the display on the VDUs 26 and 27 to change in synchronised directional relationship to the cabin movements, responsively to the input to the CPUs of the sensor output signals. The general aim of the relationship between the cabin movements and the display is for the user to see the VDU 26 as a window to the external environment, the display changing in matched relationship to the cabin movements which the user is producing and to which the user is being physically subjected, while the VDU 27 provides an appropriate radar-type display covering a wider or more extensive field. The physical sense of movement is heightened by the in-built vibration generator 45 and the in-built sound generator 43, which respond to impacts, collisions etc. which occur in the course of the game. Such impacts or collisions may result in a programmed limited loss of control. In this connection it is important to note that the sensors are responsive to all cabin movement, and control the picture display accordingly, and are not simply responsive to movement produced by the joystick.

The game generator 42 can act through the CPU 40 to superimpose a game, such as an alien-intruders type game, on the basic display, whereby the user may track the moving objects in the game by moving the cabin in the appropriate manner. If the game generator is not operated, the device may act as a simple real-life flight simulator.

The embodiment described with reference to the drawings can be modified in various ways within the spirit of the invention as defined by the appended claims. For example, the cabin or other user occupancy means may be mounted for movement in other ways and be driven pneumatically or hydraulically. The movements of the cabin may be in part dictated by the computer means. However, the essential requirements for the invention are for the movement of the cabin to be at least in part controllable, and for these at least in part controlled movements to be sensed to enable control of an on-board display unit such that the display is changed responsively to the cabin movements.

We claim:

1. A simulation device, comprising:
   user occupancy means;
   a yoke as a support on which said user occupancy means is mounted with freedom for rotational movement about a first axis extending through said occupancy means;
   a structure having a base on which said yoke is mounted with freedom for rotational movement about a second axis generally normal to the first axis and extending through said occupancy means;
   prime mover means for moving said occupancy means at least in rotation about said first axis and said yoke in rotation at least about said second axis;
   manual control means, carried by said occupancy means, for causing said prime mover means to drive said occupancy means and said yoke in a controlled manner at least in rotation respectfully about said first axis and said second axis;
   a VDU carried by said occupancy means, said VDU being capable of displaying a computer generated picture responding to picture signals fed thereto;
   sensor means for sensing rotational movement of said occupancy means, said sensor means comprising a first sensor directly responsive to rotation of said user occupancy means relative to said yoke and a second sensor directly responsive to rotation of said yoke relative to said base structure so that there is one sensor for each axis of rotation thereby permitting said sensor means to be responsive to all movement of said user occupancy means, said sensor means not forming a part of, and not being responsive to, said manual control means; and
   a computer which is fed from said sensor means and which generates picture signals fed to the VDU so as to cause the display to scroll in synchronized relationship to said rotational movements of said occupancy means and said yoke respectively about said first axis and said second axis, said movement including those produced by the use of said manual control means.

2. A device according to claim 1, wherein said prime mover means comprises a plurality of electric motors, one for each axis of rotation.

3. A device according to claim 1, having a window-type display and a radar-type display.

4. A device according to claim 3, wherein each display is controlled by a separate computer processor.

5. A device according to claim 1, including a game program generator for superimposing a supplementary scene on at least part of the display.

6. A device according to claim 1, wherein the manual control means comprises a joystick.

7. A device according to claim 1, wherein the user occupancy means is a cabin.

8. A device according to claim 7, wherein said yoke is mounted for rotational movement about said second axis and said cabin is suspended between the arms of said yoke on a mounting which defines said first axis of rotation.

9. A device according to claim 1, wherein the VDU is capable of responding to movement of a user in said user occupancy means.

10. A device according to claim 1 including a vibration generator and an audio generator.

* * * * *